(12) United States Patent
Filippi et al.

(10) Patent No.: US 8,591,770 B2
(45) Date of Patent: Nov. 26, 2013

(54) PROCESS FOR THE PRODUCTION OF SYNGAS FOR AMMONIA SYNTHESIS

(75) Inventors: Ermanno Filippi, Castagnola (CH); Geoffrey Frederick Skinner, Berkshire (GB)

(73) Assignee: Ammonia Casale SA (CH)

( * ) Notice: Subject to any disclaimer, the term of this patent is extended or adjusted under 35 U.S.C. 154(b) by 417 days.

(21) Appl. No.: 12/481,360

(22) Filed: Jun. 9, 2009

(65) Prior Publication Data

US 2009/0314994 A1    Dec. 24, 2009

(30) Foreign Application Priority Data

Jun. 20, 2008  (EP) .................................... 08011242

(51) Int. Cl.
*C01C 1/04* (2006.01)
*C01B 3/24* (2006.01)
*B01J 7/00* (2006.01)

(52) U.S. Cl.
USPC ........... 252/374; 252/376; 422/148; 422/170; 422/171; 423/359

(58) Field of Classification Search
USPC ............. 62/616; 252/374, 375, 376; 423/359; 422/148, 170, 171
See application file for complete search history.

(56) References Cited

U.S. PATENT DOCUMENTS

| 3,442,613 | A | * | 5/1969 | Grotz, Jr. ..................... | 423/354 |
| 3,501,921 | A | * | 3/1970 | Alexander et al. .............. | 62/641 |
| 3,572,046 | A | * | 3/1971 | Grotz, Jr. ......................... | 62/634 |
| 4,409,196 | A | * | 10/1983 | Skinner et al. ................. | 423/359 |
| 4,524,056 | A | * | 6/1985 | Banquy ......................... | 423/359 |
| 4,592,860 | A | * | 6/1986 | Fuderer ......................... | 252/376 |
| 4,592,903 | A | * | 6/1986 | Osman et al. .................. | 423/359 |
| 4,613,492 | A | * | 9/1986 | Winter .......................... | 423/359 |
| 4,695,442 | A | * | 9/1987 | Pinto et al. .................... | 423/359 |
| 4,733,528 | A | * | 3/1988 | Pinto ............................ | 60/39.12 |
| 5,935,544 | A | * | 8/1999 | Bhakta .......................... | 423/359 |
| 7,090,816 | B2 | * | 8/2006 | Malhotra et al. ............... | 423/359 |
| 7,897,130 | B2 | * | 3/2011 | Filippi et al. .................. | 423/359 |
| 2008/0170980 | A1 | * | 7/2008 | Reddy et al. ................... | 423/359 |

FOREIGN PATENT DOCUMENTS

| EP | 1700823 A | 9/2006 |
| GB | 1156003 A | 6/1969 |

* cited by examiner

*Primary Examiner* — Wayne Langel
(74) *Attorney, Agent, or Firm* — Akerman Senterfitt

(57) ABSTRACT

A process for producing a synthesis gas containing hydrogen and nitrogen, suitable for production of ammonia, wherein a raw synthesis gas (13) obtained by reforming of a natural gas feedstock is purified in a cryogenic separator (CS), and a portion of purified gas (16) is expanded and used as a cooling medium in the same separator, said expanded portion (16) being then re-introduced in the main stream of purified synthesis gas. A suitable apparatus and revamping of conventional plants according to the invention are also disclosed.

13 Claims, 6 Drawing Sheets

US 8,591,770 B2

PROCESS FOR THE PRODUCTION OF SYNGAS FOR AMMONIA SYNTHESIS

FIELD OF APPLICATION

The present invention refers to a process and apparatus for producing a synthesis gas or syngas mainly consisting of hydrogen and nitrogen, suitable for the synthesis of ammonia. More in detail, the invention relates to a process and apparatus wherein said synthesis gas is obtained by reforming of a hydrocarbon, for example natural gas, and cryogenic rectification.

PRIOR ART

It is prior art to carry out natural gas steam-reforming, or steam-methane reforming (SMR), and/or partial oxidation with air of a natural gas feedstock, for obtaining a synthesis gas suitable for the synthesis of ammonia, i.e. mainly containing $H_2$ and $N_2$ in a molar ratio around 3:1. The term HN ratio, in the rest of this specification, will be referred to said $H_2/N_2$ molar ratio.

A particular embodiment or version of the prior art substantially comprises a process of reforming in a first (primary) steam reformer and a secondary reformer working with air introducing an excess of nitrogen with reference to the quantity of nitrogen needed for ammonia synthesis downstream, obtaining a raw syngas containing $H_2$ and $N_2$ plus a certain amount of CO, $CO_2$, Ar and $H_2O$. Said raw syngas is purified with a cryogenic purification and HN ratio adjustment step which is performed in a suitable cryogenic section, advantageously comprising a dephlegmator, or an assembly comprising a cooling column and a reflow condenser, or the purifier known as Braun Purifier™, or similar known equipments.

Said purification and HN adjustment, in essential terms, removes the impurities ($CH_4$, Ar, $H_2O$) and nitrogen in excess. In fact, the gas exiting the secondary reformer has usually some nitrogen excess, due to air in excess inside the secondary reformer. Excess nitrogen is removed to the extent required to balance the HN ratio around the 3:1 value required for ammonia synthesis. The purified syngas is fed to a main compressor, where pressure of the syngas is raised to a value suitable for ammonia synthesis, usually 100-200 bar.

The conventional cryogenic purification process is disclosed basically in U.S. Pat. No. 3,572,046 and involves autorefrigeration and expansion of the raw syngas, to provide the net refrigeration of the cryogenic section and to keep the whole cryogenic process in heat balance. Said expansion takes place in a gas expander such as a turbine, and is indispensable to keep the cryogenic process running; however, it involves the drawback of a lower pressure at suction side of the downstream main syngas compressor, increasing the size and cost of said compressor for new plants.

In revamping of existing plants, it is often desirable to increase the syngas flow rate and, hence, the production rate of the plant. A bottleneck is however found in the pressure drop of the original expander, which has the duty of expanding the total syngas flow, and the related piping. It should also be noted that the expanded flow is passed through heat exchangers in the cryogenic section, so that a significant increase in the flow would require a new and larger expander and expensive adaptation of the cryogenic section.

There are many SMR ammonia plants in the world, including those implementing the well known Braun Purifier™ process, which may benefit from a revamping intervention and increase in the production rate. Hence, a need is felt to overcome the above drawbacks and limitations.

SUMMARY OF THE INVENTION

The problem underlying the present invention is that of improving the known process for production of syngas suitable for the synthesis of ammonia by steam reforming of natural gas, with a special reference to the revamping of existing ammonia plants including those using the Braun Purifier™ technique. In particular, the invention is aimed to reduce the afore-mentioned drawbacks connected to the syngas expansion for net refrigeration of the cryogenic purification process.

This problem is solved by a process for producing a synthesis gas containing hydrogen and nitrogen, suitable for production of ammonia, comprising the following steps:
a) a hydrocarbon feedstock is reformed, including steps of shift, CO2 removal and methanation, obtaining a raw syngas flow containing $H_2$, $N_2$ and impurities;
b) said raw gas flow is cooled to cryogenic temperature in a cryogenic section and subject to a purification and HN ratio adjustment process, so obtaining a purified syngas flow comprising $H_2$ and $N_2$ in a molar ratio about 3:1;
c) said purified syngas flow is reheated by heat exchange with the cooling raw gas flow and compressed in a main compression section, up to a pressure suitable for ammonia synthesis, characterized in that after said step of purification and HN ratio adjustment, a minor portion of said purified syngas at cryogenic temperature is separated and subject to expansion, obtaining a main stream and a minor expanded stream of purified syngas, and said minor stream is used as a heat exchange medium in said cryogenic section and then compressed and re-combined with the main stream at the outlet of said cryogenic section and upstream said main compression section.

Reforming at above point a) is preferably carried out with steam and air, obtaining a raw syngas with excess nitrogen with respect to the 3:1 molar ratio. The hydrocarbon feedstock is usually natural gas. Substitute natural gas (SNG) or another hydrocarbon, such as naphta, may be used.

The term cryogenic temperature is used with reference to a temperature around the dew point of said syngas, usually well below $-100°$ C. and typically around $-170°$ C. (170 degrees below zero).

Said minor portion of the purified syngas is preferably between 10 and 49%, more preferably about 15-30% in terms of molar flow rate. The preferred expansion ratio of said minor portion of syngas is about 1.5 to 5.0.

According to another aspect of the invention, said main portion and minor, portion of the purified syngas are separately subject to heat exchange with the raw syngas entering the cryogenic separator, to re-heat the purified syngas at around ambient temperature, and cool the raw syngas to cryogenic temperature, obtaining respective reheated syngas streams which are merged upstream the main syngas compression section. The minor portion is then compressed in a auxiliary compressor to compensate for previous expansion.

According to another aspect of the invention, the raw syngas entering the cryo section is cooled in a main heat exchanger and then in a second heat exchanger, which is preferably a reflux condenser, by heat exchange with the expanded minor portion of purified syngas and with the remaining main portion of purified syngas in the main heat exchanger, and by heat exchange with at least one of said minor portion and main portion of syngas in said second heat exchanger.

Said two heat exchangers are disposed in series, i.e. the second heat exchanger operates at a lower temperature.

In further embodiments, an excess nitrogen liquid stream, taken from the raw syngas, is used as a refrigeration medium, being re-heated and at least partly evaporated in said heat exchanger(s).

Hence, refrigeration of said main heat exchanger and second heat exchanger is provided by the re-heating of the main purified syngas flow, the re-heating of the expanded minor portion of purified syngas flow, and possibly by re-heating and partial or total evaporation of a liquid stream of condensed excess nitrogen taken from the cooling raw syngas.

In particular, and according to embodiments of the invention, one or more of the above listed refrigeration streams can bypass the second heat exchanger, being fed directly to the main exchanger. Examples are given in the detailed description.

In a preferred embodiment, the raw syngas is cooled in a main exchanger down to cryogenic temperature, then it is fed to a contacting device such as a wash column or a dephlegmator; vapour from said contacting device is further cooled in a reflux condenser and sent to a separator, where a nitrogen-rich liquid reflux stream and a purified syngas flow are obtained; the purified gas flow is then split downstream said separator into a minor portion, sent to a gas expander, and a major portion; the minor portion and major portion of the purified gas are then passed in parallel through said reflux condenser and main heat exchanger. Finally, the minor gas portion is compressed in an auxiliary recycle compressor and merged with the remaining purified syngas, around ambient temperature.

In a preferred realization, the main heat exchanger and reflux condenser are tube or plate heat exchange units inside the cryogenic section and adapted to indirect heat exchange.

The reforming is preferably performed by a primary steam reforming, and then a secondary reforming with an appropriate excess of air, followed by the steps of shift reaction, CO2 removal and methanation.

An object of the invention is also an apparatus for producing synthesis gas containing hydrogen and nitrogen, suitable for production of ammonia, the apparatus being adapted to carry out the above process.

More in detail, an object of the invention is an apparatus comprising at least:
  a hydrocarbon reforming equipment, and a further equipment for shift reaction, CO2 removal and methanation, providing a raw syngas stream containing $H_2$, $N_2$ and impurities;
  a cryogenic section for purification and rectification of said raw syngas stream, adapted to convert said raw syngas into a purified syngas stream containing $H_2$ and $N_2$ in a molar ratio about 3:1;
  a main compressor disposed to receive said purified syngas stream from the cryogenic section, and adapted to raise the pressure of the purified syngas to a value suitable for ammonia synthesis;
and characterized in that said cryogenic section comprises a flow line taking a minor portion of said purified gas stream at a cryogenic temperature, and feeding said minor portion to an expander obtaining an expanded and further cooled syngas stream; the cryogenic section further comprises at least a heat exchanger adapted to reheat said portions of purified syngas by heat exchange with the raw syngas, and the apparatus comprises an additional compressor disposed to merge said expanded minor syngas portion with the remaining purified syngas upstream said main compressor.

In a preferred embodiment, the cryogenic section comprises a purification section which in turn comprises at least a contacting device and a vapour/liquid separator. The contacting device is for example a wash column or a run-back condenser (dephlegmator); the separator receives the vapour phase from the contacting device and provides a nitrogen-rich liquid reflux stream to the same contacting device.

According to another aspect of the invention, a liquid stream taken from said contacting device, mainly consisting of nitrogen in excess, is expanded and cooled in an expansion valve and further used as a heat exchange medium, to cool the raw syngas. In a preferred embodiment, the cryogenic section comprises a main heat exchanger and a reflux condenser carrying out the heat exchange between the raw syngas entering the cryogenic section, the minor portion of purified syngas form said expander, the remaining main portion of purified syngas and expanded syngas streams, and the stream obtained from expansion of said liquid stream. Some of the refrigeration streams can bypass the reflux condenser in further embodiments.

An object of the invention is also the revamping of conventional plants. In particular, the invention discloses a method of revamping of an apparatus for producing synthesis gas containing hydrogen and nitrogen and suitable for production of ammonia, the apparatus comprising a cryogenic section for treatment of raw syngas from a steam reforming equipment, the method of revamping being characterized by the provision of means for taking a minor portion of purified gas stream at a cryogenic temperature in said cryogenic section, feeding said minor portion to a gas expander obtaining an expanded and further cooled stream of purified syngas, and using said stream as heat exchange medium to provide net refrigeration of said cryogenic section.

The process and the apparatus according to the invention have the following advantages.

The use of a minor portion of the purified gas as a cooling medium allows to obtain an effective cryogenic purification of the gaseous flow exiting the secondary reformer, thus maintaining said gas flow at a high pressure, i.e. without the need to expand and re-compress the full amount of gas.

A further advantage is that the minor portion separated from the purified gas flow, and used as a cooling medium in the cryogenic separation, is re-combined with the purified gas flow after the purification step, that is downstream the cryo section. This avoids a dilution of the flow at the inlet of the cryo section, and makes the cryogenic separation/purification more effective. Recombination of the minor portion with the main purified stream downstream the cryo section has the further advantage of reducing the input flow; the cryogenic separator then is smaller and less expensive. In case of a revamping, a greater capacity can be reached without intervening on the separator.

The overall system is surprisingly more efficient, requiring, for the same amount of expanded gas, about 30 to 60% less energy consumption in the main syngas compressor, and 20-30% smaller differences of temperature in the heat exchange area.

The invention has advantages especially in revamping of existing plants operating with a prior-art process where all the purified gas flow is expanded to provide net refrigeration of the cryo section. The expansion of a minor portion of the purified gas flow allows to increase capacity without the need of a greater expander and/or compressor.

DETAILED DESCRIPTION OF A PREFERRED EMBODIMENT

Figure 1:
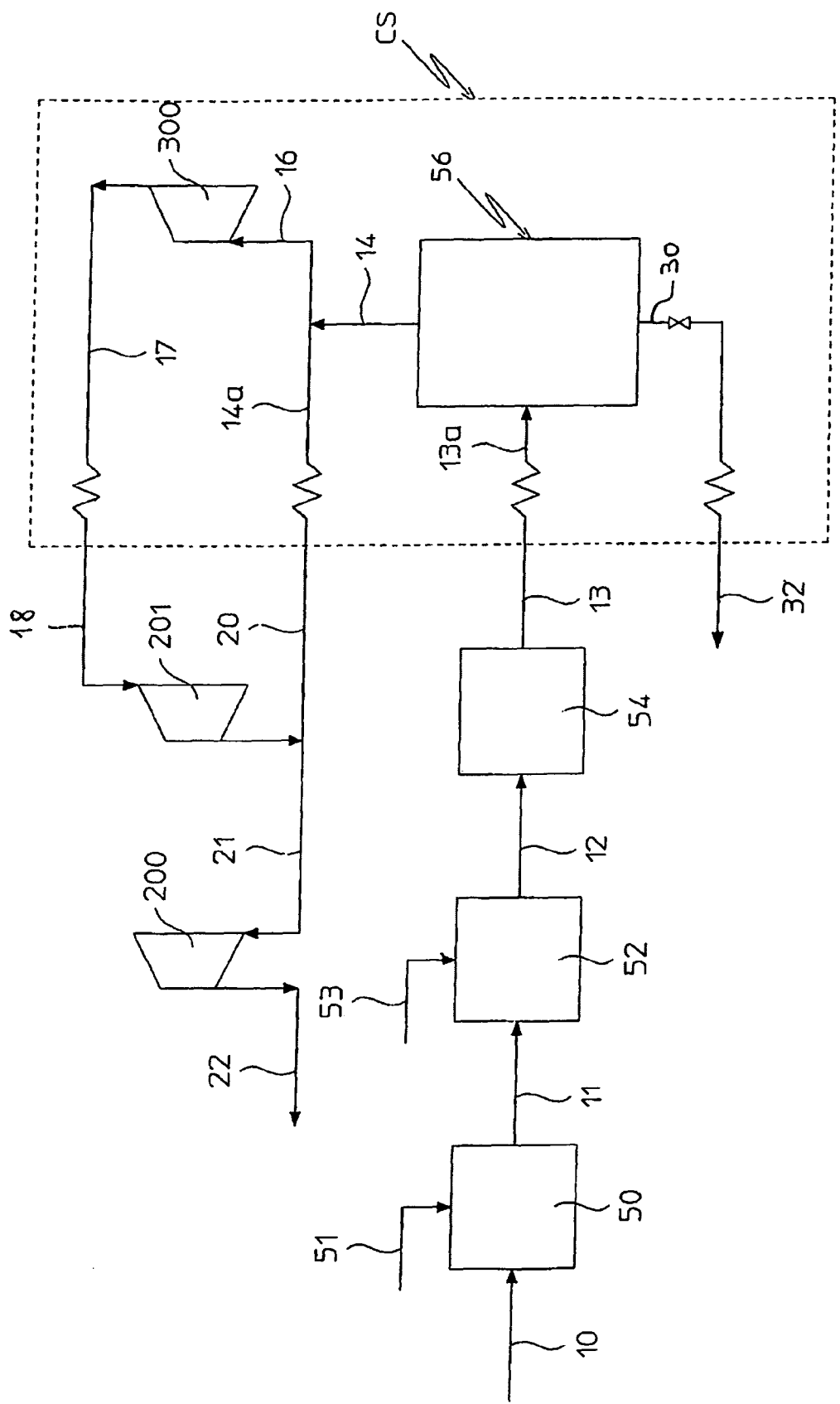
FIG. 1 is a schematic block diagram of the process in a preferred embodiment of the present invention.

Referring to FIG. 1, in the front-end of a reforming-based ammonia plant a natural gas feedstock 10 and a steam flow 51 are is fed to a primary steam reformer 50, and so obtained reformed gas 11 is sent to a secondary reformer 52 fed with air 53 and producing a raw synthesis gas stream 12. Said syngas stream 12 comprises hydrogen ($H_2$) and nitrogen ($N_2$) plus impurities and inerts such as carbon oxides (CO, $CO_2$), water, argon, residual methane.

The secondary reformer 52, in a preferred embodiment, operates with an appropriate excess of air to obtain an excess of nitrogen in raw gas 12, with respect to the quantity of hydrogen needed to provide the $H_2/N_2$ 3:1 molar ratio required at the inlet to the downstream ammonia synthesis unit. Said excess of nitrogen in raw gas stream 12 is preferably between 10% and 50% and more preferably equal to 15-30% in moles.

The raw gas stream 12 is then treated in a section 54 according to the standard configuration of reforming-based ammonia plants, i.e. the gas is shifted to convert $CO+H_2O$ into $H_2$ and $CO_2$, then the $CO_2$ is removed and the residual carbon oxides are converted to methane in a methanator. These process steps are not shown in detail as they are well known.

The dry $CO_2$-free gas so obtained is fed via line 13 to a cryogenic (cryo) section CS for cryogenic purification and rectification. Cryo section CS is generally indicated by the dotted boundary line in FIG. 1, and may comprise a plurality of equipments, in accordance with different embodiments of the invention. In particular, a purification section 56 is comprised in said cryo section CS, obtaining a purified syngas 14 by separation of a liquid stream 30 comprising the condensed excess nitrogen plus smaller quantities of condensed methane and argon.

The raw syngas 13 is cooled to a cryogenic temperature, e.g. around −170° C., obtaining a cooled flow 13a that is purified in said purification section 56. The so obtained purified syngas 14 is split into a main portion 14a and a minor portion 16, which is expanded in a gas expander 300, typically a turbine. Due to the expansion, said portion 16 is further cooled, typically by around 10° C.

The purified syngas main portion 14a and minor portion 17, this last being taken from expander 300, are used as heat exchange media in the cryo section CS, and exit the cryo section CS as streams 20 and 18 respectively.

In the shown embodiment, the streams 14a and 17 of purified syngas are subject to heat exchange in parallel and in two heat exchange units of the cryo section CS, namely a main heat exchanger and a reflux condenser which will be disclosed in a more detailed manner hereinbelow.

The gas stream 18, i.e. the minor purified syngas portion at the outlet of the cryo section CS, is re-compressed in an auxiliary compressor 201, recovering the pressure drop across expander 300, and merged with the main stream 20, forming the input stream 21 to a main syngas compressor 200. Said compressor 200 is usually a multi-stage unit feeding the ammonia section (not shown) with a high-pressure stream 22 to 100 bar or more.

The liquid stream 30 is also used as a heat exchange medium in the cryo section. A stream 32 resulting from evaporation of said liquid stream 30 and containing nitrogen, methane and argon is also discharged by the cryo section CS and typically used as a fuel.

The process is now described in greater detail with reference to the preferred realization shown in FIG. 2.

The main components of the cryo section CS are: a main heat exchanger HE1, a reflux condenser HE2, a contacting device 57 and a liquid/vapour separator 58 forming the purification section 56, and the turbine-expander 300. The contacting device 57 in the example is a wash column, although a run-back condenser or "dephlegmator" may be used.

The dry $CO_2$-free feed gas at stream 13 enters the cryogenic section CS typically at a temperature between 0° C. and 40° C. It is cooled in the main heat exchanger HE1 to or slightly below its dew point obtaining stream 13a at around −170° C.

The cooled stream 13a then enters wash column 57. A nitrogen-rich liquid reflux stream 13d is supplied to the top of the column from separator 58. The overhead vapour stream 13b from the column 57 is cooled in reflux condenser HE2 obtaining a cooled stream 13c entering the vapor/liquid separator 58. The liquid leaving the base of separator 58 forms the above-mentioned reflux stream 13d. The temperature of said cooled stream 13c is regulated to a level at which the purified vapour stream 14 leaving the separator 58 has the requisite $H_2:N_2$ molar ratio of close to 3 for the downstream ammonia synthesis unit. Temperature of stream 13c is usually around −180° C., depending on the application.

Most of said purified syngas stream 14, typically 70 to 85%, forms the main stream 14a heated in reflux condenser HE2 to 14b at a temperature just below that of stream 13b. Stream 14b is then further heated in main exchanger HE1 obtaining the stream 20 at a temperature just below the temperature of the raw gas stream 13 from reformers. This is the main part of the final synthesis gas product from the cryogenic section CS. Typically, the stream 20 has a pressure of between 20 and 40 bar, although lower or higher pressures may be used.

The liquid stream 30 leaving the base of the wash column 57, comprising the condensed excess nitrogen plus smaller quantities of condensed methane and argon, is flashed through a valve 59, to a pressure typically below 5 bar, obtaining a flashed stream 31. Said flashed stream 31 is then directed through a passage in reflux condenser HE2, being therein partially evaporated to stream 31a by heating to a temperature just below that of stream 13b. This stream 31a then passes through the main exchanger HE1, in which it also attains a temperature just below the temperature of the feed stream 13. The resulting stream 32 at the output of the cryo section is typically used as plant fuel.

Because the heating of streams 14a and 31 in reflux condenser HE2 as described above is generally insufficient to provide the cooling required between streams 13b and 13c, a minor part 16 of the purified synthesis gas stream 14 is passed to expander 300, exiting as stream 17 at a reduced pressure, typically between 15 bar and 20 bar, and reduced temperature due to the expansion itself. Preferably the expander 300 is a turbine, recovering a mechanical work W.

This expanded and further cooled stream 17 is then heated in condenser HE2 obtaining stream 17a to a temperature just below that of stream 13b, thereby completing the heat balance of HE2. Stream 17a is then further heated in the main exchanger HE1 obtaining a stream 18 at a temperature just below the temperature of the feed stream 13, completing the heat balance of main heat exchanger HE1.

Also the remaining main part 14a of the purified gas stream 14, as shown, is passed through the condenser HE2 and main heat exchanger HE1 obtaining the main stream 20.

The expanded and re-heated stream 18 is then fed to the auxiliary compressor 201, recovering the pressure drop across expander 300, and rejoins the main stream 20, forming the stream 21 that is the full flow of synthesis gas product made available for the downstream ammonia synthesis unit. Stream 21 typically flows directly to the main synthesis gas compressor 200, which generates a high-pressure stream 22 at around 100-200 bar for the downstream ammonia synthesis unit.

It should be noted that the invention provides for additional refrigeration at the coldest point in the process scheme—on the cold side of heat exchanger HE2—by means of expanding a minor part of the product gas (stream 14) through the expander 300, that expanded part being subsequently heated to ambient temperature and recompressed into the major part of the product gas.

Figure 2:
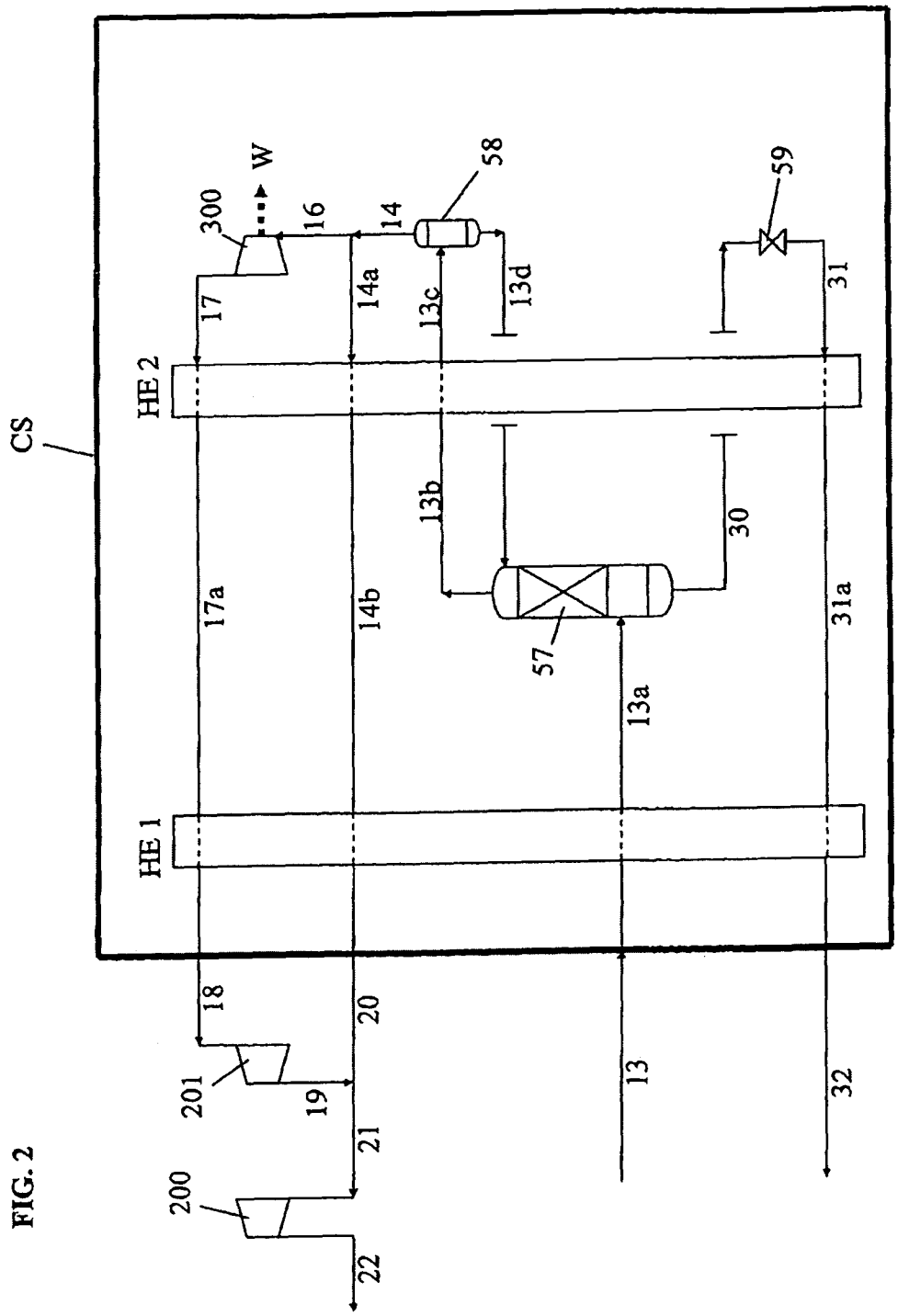
FIG. 2 is a more detailed scheme of a preferred embodiment of a process and apparatus according to the invention.

In FIG. 2 some significant refrigeration for heat exchanger HE2 is also provided by the reheating of the major part of the product gas (from stream 14a to stream 14b) and by the reheating and at least in part evaporation of stream 31 as it passes through HE2 to become stream 31a.

Figure 3:
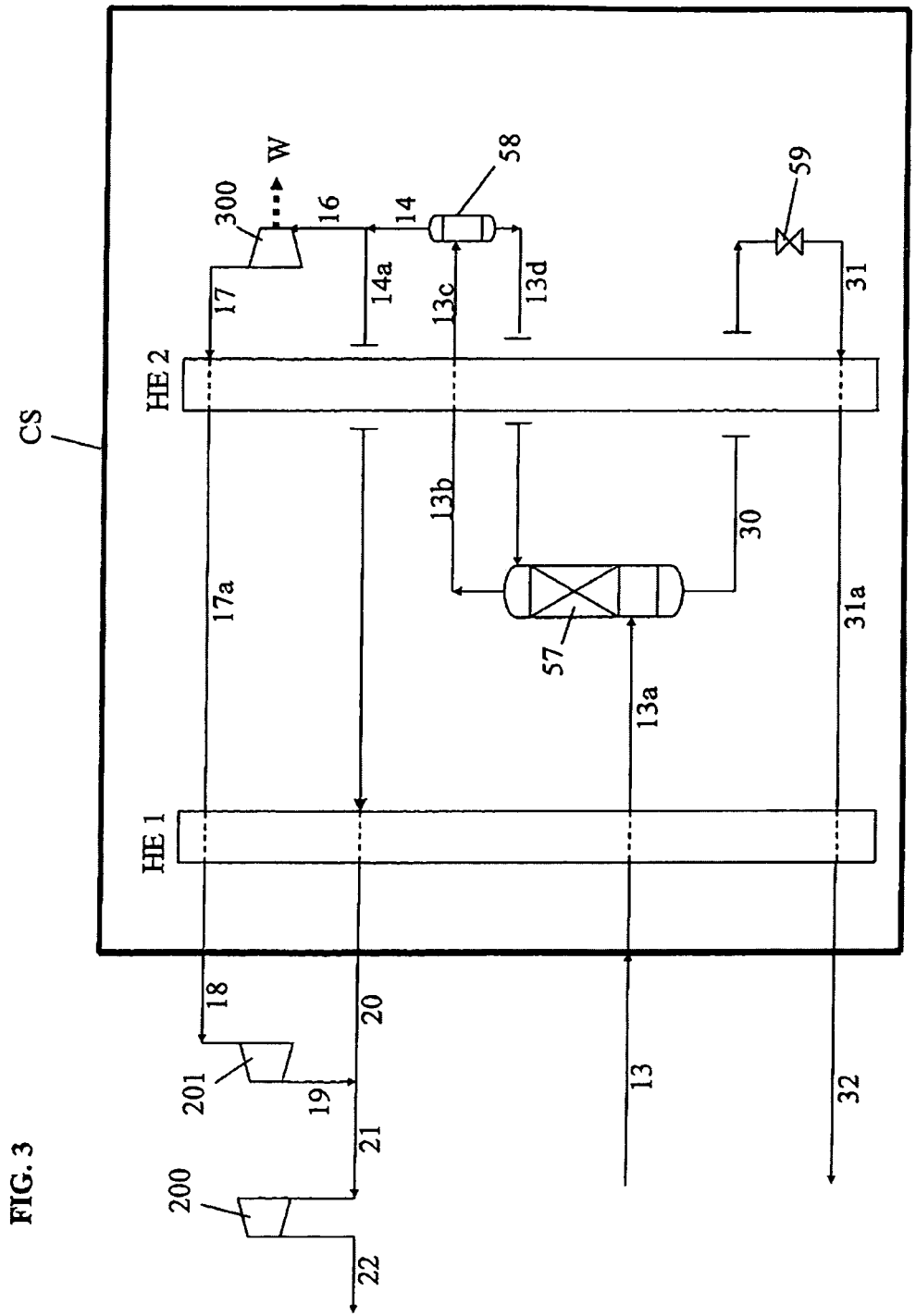
FIGS. 3 to 6 are schemes of further embodiments.

Alternative embodiments of FIG. 3 to 6 are now presented. In FIG. 3, the portion 14a of purified syngas stream bypasses the reflux condenser HE2 and is sent directly to the heat exchanger HE1. Refrigeration to the condenser HE2, hence, is provided by stream 17 heated to 17a, and by reheating and partial evaporation of stream 31.

Figure 4:
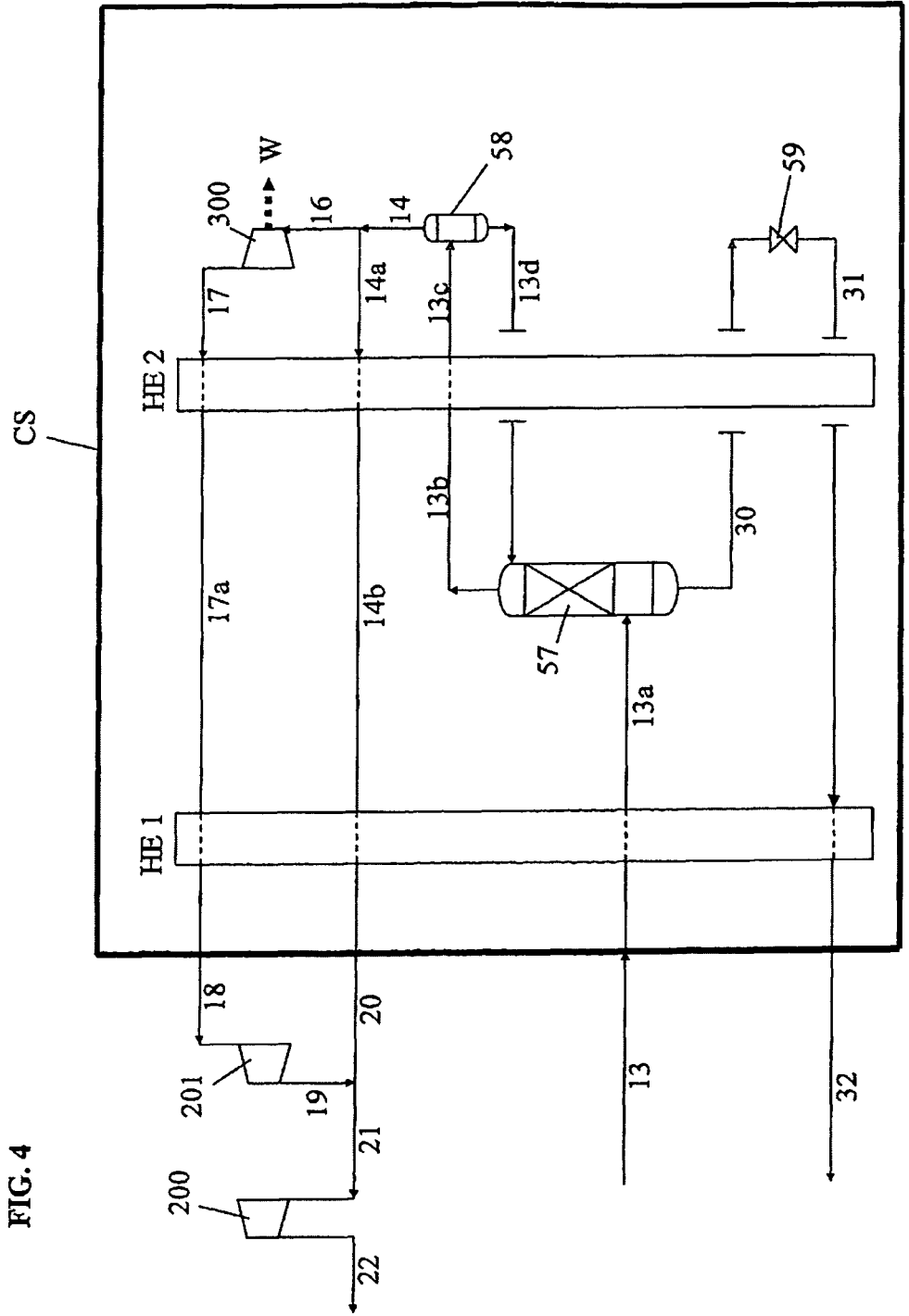

In the further embodiment of FIG. 4, the stream 31 bypasses the condenser HE2 and is sent to the main exchanger HE1, so that refrigeration of HE2 is provided by stream 14a and stream 17.

Figure 5:
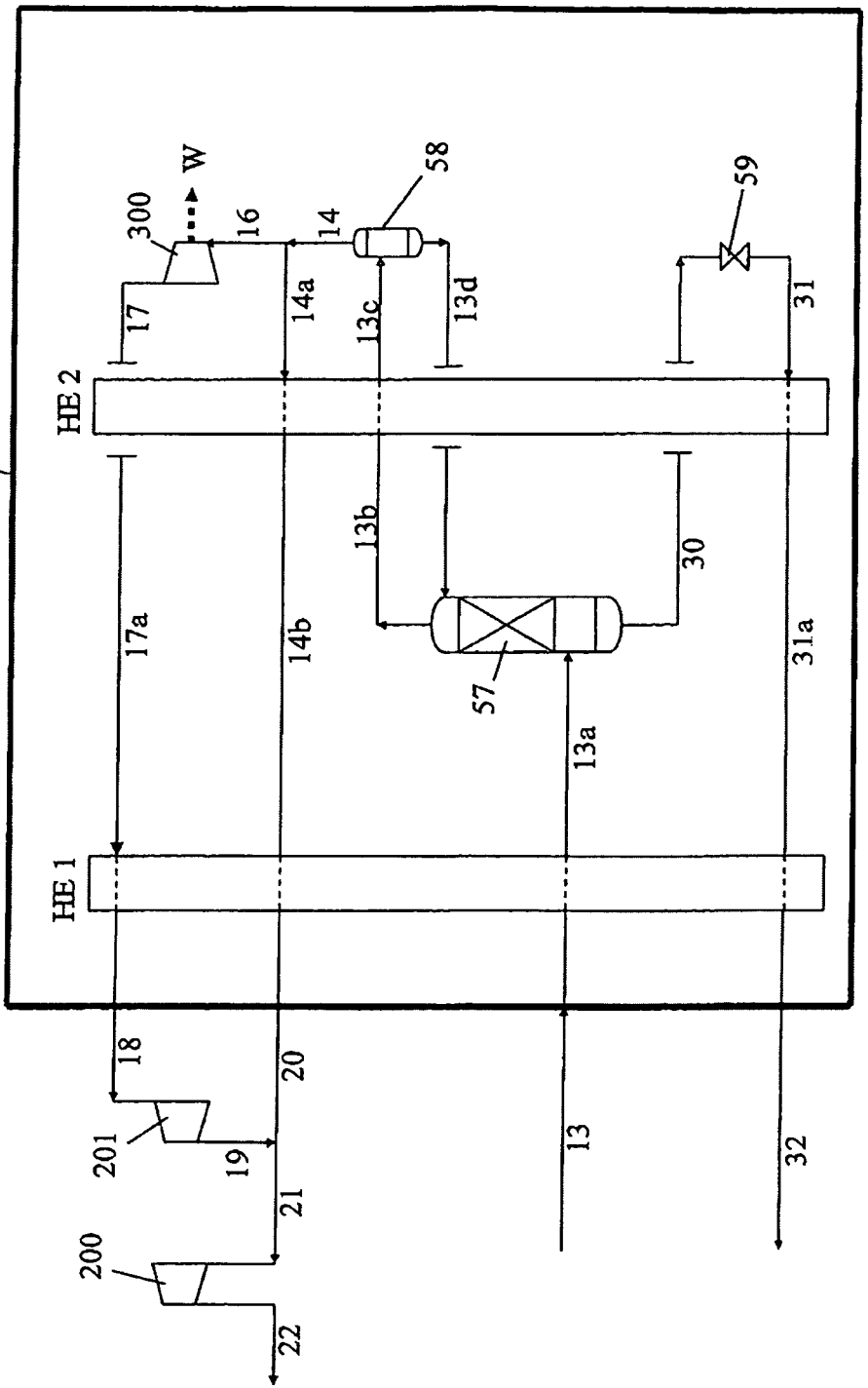

In embodiment of FIG. 5, the syngas stream 17 bypasses the condenser HE2.

Figure 6:
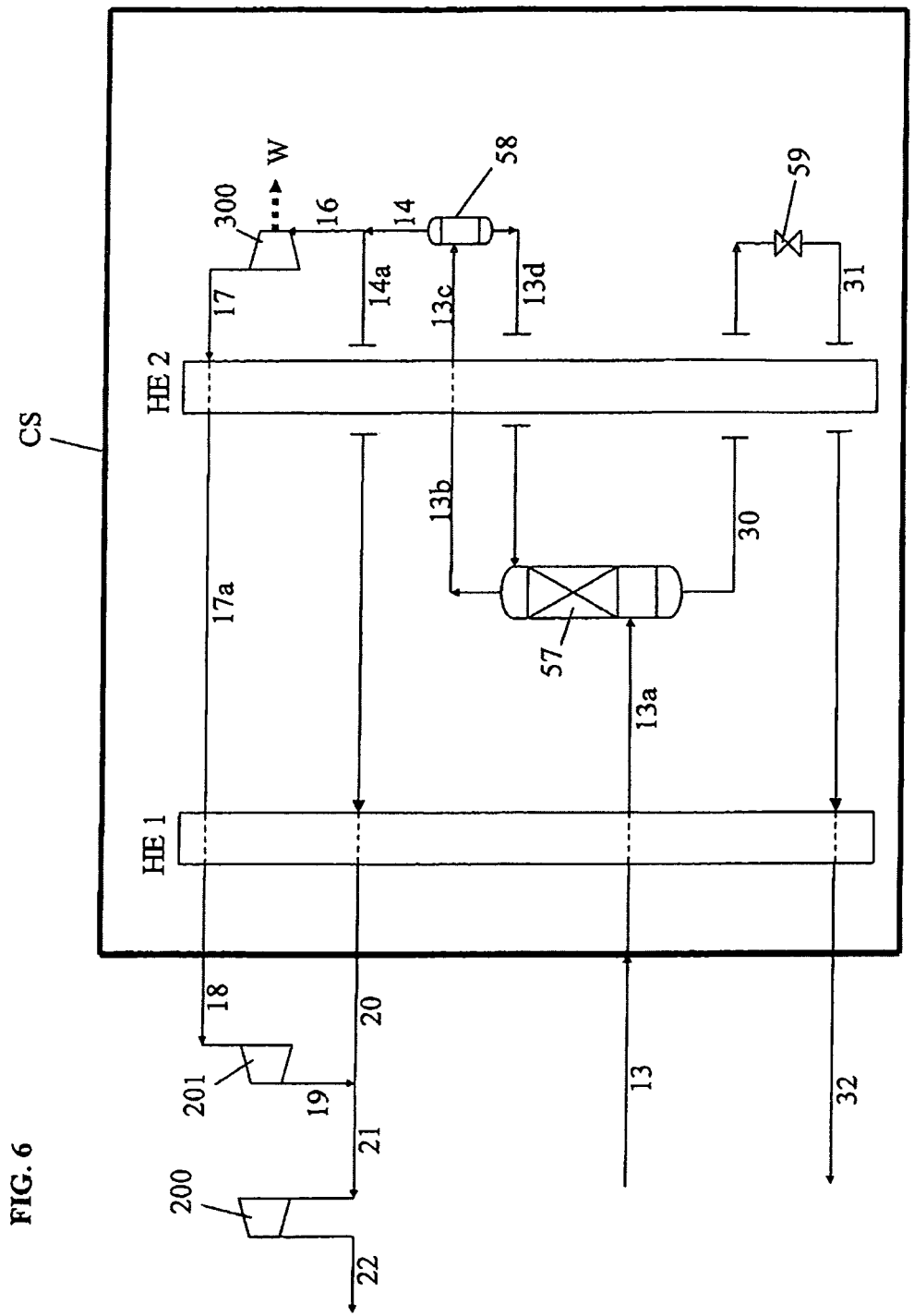

In embodiment of FIG. 6, both syngas stream 14a and liquid stream 31 bypasses the condenser HE2, so that the heat exchange in HE2 is between the purified syngas portion 17 re-heated to 17a, and the raw syngas 13b cooled to 13c.

As stated above, the invention is also directed to a method for revamping a conventional plant for production of synthesis gas adapted for synthesis of ammonia, characterized by modifying the existing plant in such a way to carry out the above process, in particular by providing the flow line feeding the minor portion 16 of the purified syngas to the expander 300, and stream 17 to exchangers HE2 and HE1, or directly to HE1 as in FIG. 5.

More in detail, in an apparatus for producing synthesis gas comprising inter alia the cryogenic section CS for treatment of raw syngas 13 from steam reformers 50, 52 and treatment section 54, the method of revamping involves the provision of at least the flow line 16 taking a minor portion of purified gas stream 14, at a cryogenic temperature in said cryogenic section CS, and feeding said portion 16 to the expander 300 obtaining the expanded and cooled stream 17 of purified syngas, which is used as heat exchange medium to provide net refrigeration of said cryogenic section. In the revamping intervention, the expander 300 may be an original (preexisting) expander or a new one.

The invention is susceptible of application to further syngas production techniques, including to non-standard syngas production such as gas-heated convection reformers. In further embodiments, the primary reformer may not be included in the process.

The invention claimed is:

1. A process for producing a synthesis gas containing hydrogen and nitrogen, for production of ammonia, comprising the steps of:
    reforming a hydrocarbon feedstock, including steps of shift, $CO_2$ removal and methanation, obtaining a raw syngas flow containing $H_2$, $N_2$ and impurities;
    cooling said raw syngas flow to cryogenic temperature in a cryogenic section and subjecting said raw syngas flow to a purification and HN ratio adjustment, obtaining a purified syngas flow comprising $H_2$ and $N_2$ in a molar ratio about 3:1;
    reheating said purified syngas flow in said cryogenic section and then compressing said purified syngas flow in a main compression section, up to a pressure value suitable for ammonia synthesis;
    separating a minor portion of said purified syngas at cryogenic temperature after said step of purification and HN ratio adjustment, and subjecting said minor portion to expansion, obtaining a main purified syngas stream and a minor, expanded purified syngas stream; and
    using said minor stream as a heat exchange medium in said cryogenic section, and then compressing and re-combining said minor stream with the main stream at the outlet of said cryogenic section and upstream of said main compression section.

2. The process according to claim 1, wherein said minor portion of the purified syngas is between 10% and 49% in terms of molar flow rate.

3. The process according to claim 1, wherein said expansion of a minor portion of purified syngas has an expansion ratio between 1.5 and 5.0.

4. The process according to claim 1, wherein said main portion and minor portion of the purified syngas are separately subject to heat exchange with the raw syngas entering the cryogenic separator, obtaining respective reheated syngas streams which are merged upstream the main syngas compression section.

5. The process according to claim 1, wherein the raw syngas is cooled in a main heat exchanger and then in a second heat exchanger, by heat exchange with the expanded minor portion of purified syngas and with the remaining main portion of purified syngas in the main heat exchanger, and by heat exchange with at least one of said minor portion and main portion of syngas in said second heat exchanger.

6. The process according to claim 5, wherein:
    the raw syngas is cooled in a main heat exchanger of said cryogenic section down to cryogenic temperature, then it is fed to a contacting device;
    vapour from said contacting device is further cooled in a reflux condenser and sent to a separator, where a nitrogen-rich liquid reflux stream and a purified syngas flow are obtained;
    the purified gas flow is then split downstream said separator into a minor portion sent to an expander, and a major portion;
    the minor portion and major portion of the purified gas are then passed in parallel through said reflux condenser and main heat exchanger and reheated to around ambient temperature by exchanging heat mainly with the raw syngas stream;
    the minor gas portion is compressed in an auxiliary recycle compressor and merged with the remaining purified syngas upstream a main compressor of the syngas.

7. The process according to claim 5, wherein the raw syngas is further cooled by heat exchange with an excess nitrogen liquid stream taken from the raw syngas itself, in said main heat exchanger and optionally in said second heat exchanger.

8. The process according to claim 2, wherein said minor portion of the purified syngas is between 15 and 30% in terms of molar flow rate.

9. An apparatus for producing synthesis gas containing hydrogen and nitrogen for production of ammonia according to the process of claim 1, the apparatus comprising:
- a hydrocarbon reforming equipment and equipment for shift reaction, $CO_2$ removal and methanation, providing a raw syngas stream containing $H_2$, $N_2$ and impurities;
- a cryogenic section adapted to convert said raw syngas stream into a purified syngas stream containing $H_2$ and $N_2$ in a molar ratio about 3:1;
- a main compressor disposed to receive said purified syngas stream from the cryogenic section, and adapted to raise the pressure of the purified syngas to a value suitable for ammonia synthesis;
- a first flow line connecting a purification section of said cryogenic section with said main compressor for feeding therein said purified gas stream;
- wherein said cryogenic section comprises a second flow line connecting said first flow line with an expander for feeding therein a minor portion of purified gas stream at a cryogenic temperature obtaining an expanded and further cooled stream of purified syngas;
- the cryogenic section further comprises at least one heat exchanger and a third flow line in fluid communication with said expander and said at least one heat exchanger for feeding therein said cooled stream of purified syngas as heat exchange medium, and the apparatus comprises an additional compressor disposed to merge said expanded minor portion with the remaining purified syngas upstream said main compressor.

10. The apparatus according to claim 9, wherein said cryogenic section comprises a purification section which in turn comprises at least one contacting device, a fourth flow line for feeding cooled raw syngas to said at least one contacting device, a vapour/liquid separator, a fifth flow line for feeding a vapour phase from said contacting device to said separator and a sixth flow line for feeding a nitrogen-rich liquid reflux stream from said separator to the same contacting device.

11. The apparatus according to claim 10, further comprising an expansion valve, a seventh flow line for feeding an excess nitrogen liquid stream from said contacting device to said expansion valve where said excess nitrogen liquid stream is expanded and cooled, and an eighth flow line for feeding the expanded and cooled excess nitrogen liquid stream to said cryogenic section as a heat exchange medium for heating the purified syngas and cooling raw syngas.

12. The apparatus according to claim 11, wherein the cryogenic section comprises a main heat exchanger and a second heat exchanger for cooling the raw syngas entering the cryogenic section.

13. The apparatus according to claim 12, wherein said second heat exchanger is a reflux condenser.

* * * * *